US009465902B1

(12) United States Patent
Brugada et al.

(10) Patent No.: US 9,465,902 B1
(45) Date of Patent: Oct. 11, 2016

(54) METHOD AND APPARATUS FOR DESIGNING A SYSTEM USING WEIGHTED-COST INTERCONNECT SYNTHESIS

(71) Applicant: Altera Corporation, San Jose, CA (US)

(72) Inventors: Silvio Brugada, San Francisco, CA (US); Aaron Ferrucci, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/251,155

(22) Filed: Apr. 11, 2014

(51) Int. Cl.
*G06F 17/50* (2006.01)

(52) U.S. Cl.
CPC ....... *G06F 17/5077* (2013.01); *G06F 17/5054* (2013.01)

(58) Field of Classification Search
CPC ............. G06F 17/505; G06F 17/5054; G06F 17/5077
USPC ......... 716/100, 128, 139, 116–117, 126, 130
See application file for complete search history.

(56) References Cited

U.S. PATENT DOCUMENTS

| | | | |
|---|---|---|---|
| 6,175,948 B1 * | 1/2001 | Miller et al. ................... | 716/105 |
| 6,408,427 B1 * | 6/2002 | Cong .................. | G06F 17/5077 716/129 |
| 6,871,336 B1 * | 3/2005 | Anderson ........... | G06F 17/5072 716/122 |
| 6,931,617 B2 * | 8/2005 | Sanie .................. | G06F 17/5068 716/104 |
| 8,099,757 B2 * | 1/2012 | Riedl et al. .................... | 725/116 |
| 8,341,581 B2 * | 12/2012 | Koo ................ | 716/117 |
| 8,578,075 B1 | 11/2013 | Ferrucci et al. | |
| 8,605,098 B2 * | 12/2013 | Chandra .................. | G06T 1/60 345/530 |
| 8,661,380 B1 | 2/2014 | Baeckler et al. | |
| 8,667,439 B1 * | 3/2014 | Kumar et al. ................ | 716/108 |
| 8,751,989 B1 * | 6/2014 | Harrer ................ | G06F 17/5077 716/115 |
| 8,819,616 B2 * | 8/2014 | Philip et al. ................... | 716/138 |
| 8,843,865 B2 * | 9/2014 | Tai ...................... | G06F 17/5068 716/110 |
| 8,885,510 B2 * | 11/2014 | Kumar et al. ................ | 370/252 |
| 9,087,164 B2 * | 7/2015 | Perry ...................... | G06F 17/50 |
| 2004/0210856 A1 * | 10/2004 | Sanie .................. | G06F 17/5068 716/54 |
| 2005/0108668 A1 * | 5/2005 | Kabuo ................ | G06F 17/5072 716/114 |
| 2006/0049468 A1 * | 3/2006 | Cheng et al. .................. | 257/401 |
| 2008/0120129 A1 * | 5/2008 | Seubert et al. ................... | 705/1 |
| 2010/0325599 A1 * | 12/2010 | Perry et al. ................... | 716/122 |
| 2011/0055791 A1 * | 3/2011 | Gao .............................. | 716/131 |
| 2012/0290963 A1 * | 11/2012 | Moll et al. .................... | 715/771 |
| 2013/0298100 A1 * | 11/2013 | Hastings ................ | G06F 17/50 716/126 |
| 2014/0129182 A1 * | 5/2014 | Weatherhead .......... | G06F 17/50 703/1 |
| 2014/0365548 A1 * | 12/2014 | Mortensen ............ | G06F 9/3001 708/523 |

* cited by examiner

*Primary Examiner* — Stacy Whitmore
(74) *Attorney, Agent, or Firm* — L. Cho

(57) ABSTRACT

A method for generating a design for a system implemented on a target device includes presenting a user with an interface that allows the user to weight objectives for an interconnect architecture of the design. The interconnect architecture is generated in response to weighted objectives provided by the user.

31 Claims, 13 Drawing Sheets

METHOD AND APPARATUS FOR DESIGNING A SYSTEM USING WEIGHTED-COST INTERCONNECT SYNTHESIS

FIELD

Embodiments of the present invention relate to tools for designing systems on target devices. More specifically, embodiments of the present invention relate to a method and apparatus for designing a system on a target device using weighted-cost interconnect synthesis.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation, synthesis, placement, and routing of the system on the target device.

The use of pre-designed blocks of logic, known as intellectual property (IP) cores, have increased with current systems. Some systems utilize dozens to hundreds of IP cores. The IP cores may be used for implementing processors, memory controllers, or components that perform other functionalities. Each IP core may present a unique set of interfacing signals with its own requirements. In order to instantiate an IP core into a system, appropriate adaptation logic between components needs to be selected when designing an interconnect architecture for the system.

When designing an interconnect architecture for a system, some design tools apply pre-defined strategies for the system. Other design tools apply hard constraints which limit it from fully exploring available design options.

SUMMARY

A method and apparatus for designing a system on a target device using weighted-cost interconnect synthesis is disclosed. A system interconnect architecture is generated utilizing a plurality of objectives manifested by cost functions. Each cost function measures one or more aspects or characteristics of the interconnect architecture. Each of the cost functions is provided a weighting factor which reflects its importance to the user. The cost functions may reflect a system's throughput, length of critical path, maximum frequency, power consumption, use of hardware resources, and/or other characteristic or aspect.

According to a first embodiment of the present invention, a method for generating a design for a system implemented on a target device includes presenting a user with an interface that allows the user to weight objectives for an interconnect architecture of the design. An interconnect architecture is generated in response to weighted objectives provided by the user. According to an embodiment of the present invention, a start state solution is generated for the interconnect architecture and a goal test is performed on the start state solution. Candidate solutions are generated in response to the start state solution failing the goal test. The candidate solutions are generated by adding a node that results in increasing a first cost for implementing the candidate solutions and decreasing a second cost that reflects violations incurred by the candidate solutions, wherein the first and second costs are derived from the weighted objectives. A candidate solution with a lowest combined cost is selected and a goal test is performed on the selected candidate solution.

According to a second embodiment of the present invention, a user interface includes a mechanism that allows a user to select objectives for a design of an interconnect architecture for a system to be implemented on a target device. The user interface further includes a mechanism that allows a user to weight the objectives and input the weighted objectives into a design tool that generates the design of the interconnect architecture in response to the weighted objectives. The selectable objectives may include throughput, performance latency, resource count, power consumption, and/or other objectives.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
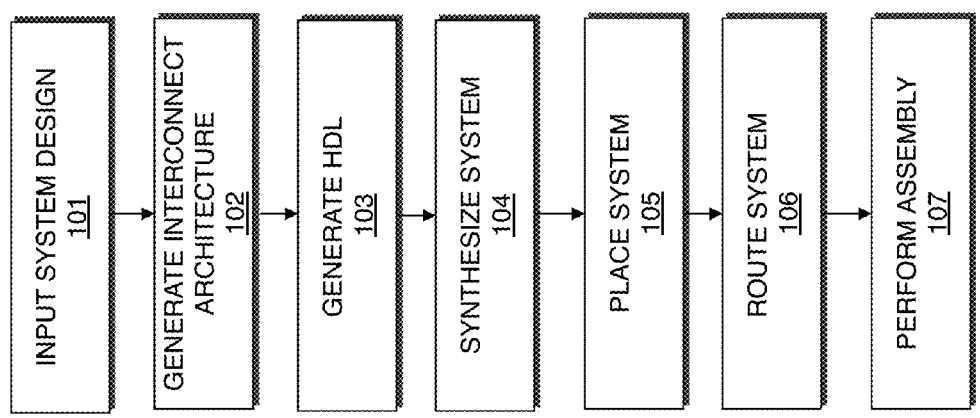
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system. At 101, a description of a system is input into the EDA tool. It should be appreciated that the description of the system may be inputted automatically by an external component or tool or manually by a user. The description of the system may be a high level description generated by a user. The description may identify components ("user components") in the system, such as processors, memories, receivers/transmitters, input outputs, and the interfaces on these components. The interfaces on the components may have an associated bus type, timing requirement, and behavior requirement. Some of these components may operate in a master-slave relationship.

At 102, an interconnect architecture is generated to connect the components in the system. The interconnect architecture includes a collection of interconnect components and network adapters. According to an embodiment of the present invention, the interconnect architecture is generated by utilizing a plurality of objectives, each of which are measured by a corresponding cost function. The cost functions may be selected or provided by a user. Each cost function measures one or more aspects or characteristics for the system. How a cost function guides the generation of the interconnect architecture may be specified by the user by the weight assigned to the cost function.

At 103, a hardware description language (HDL) design definition is generated to describe the interconnect architecture and system.

At 104, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 105, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

At 106, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 107, an assembly procedure is performed. The assembly procedure involves creating a data file that includes information determined by the procedures described at 101-108. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
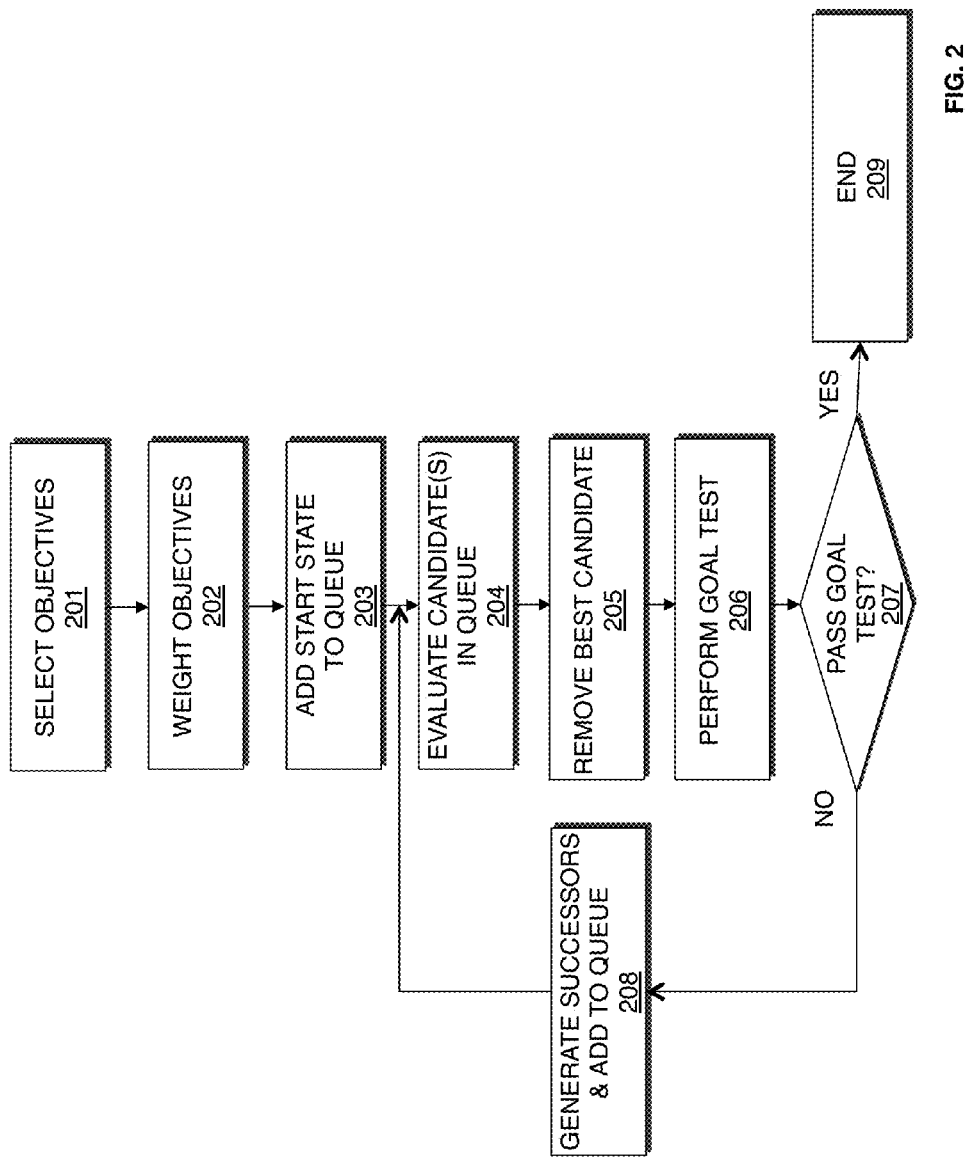
FIG. 2 is a flow chart illustrating a method for generating an interconnect architecture for a system according to an exemplary embodiment of the present invention.

FIG. 2 is a flow chart illustrating a method for generating an interconnect architecture for a system according to an exemplary embodiment of the present invention. The procedures described in FIG. 2 may be used to implement procedure 102 shown in FIG. 1. At 201, objectives for the interconnect architecture for the system are selected by a user. The objectives may include aspects or characteristics which the user wishes to consider when generating the interconnect architecture. According to an embodiment of the present invention, the objectives may be selected from a list on a user interface. Alternatively, the user may input objectives. The objectives include a corresponding cost function for evaluating one or more aspects or characteristics of an interconnect architecture solution. Exemplary objectives that may be selected may include throughput, latency, power consumption, and resource count. Other objectives may also be selected.

At 202, the objectives are weighted by the user. The objectives are weighted to reflect their relative importance to the user. According to an embodiment of the present invention, the user is provided an interface to input weighting factors. The interface may be a graphical user interface such as a slider or other mechanism. Alternatively, the interface may be an input line. It should be appreciated that other mechanisms may be used by the user to input weighting factors such as inputting a file that includes vectors with weighting factors.

At 203, a start state solution for the interconnect architecture is added to a queue. According to an embodiment of the present invention, the start state solution may be an initial solution for the interconnect architecture derived from a description of the system provided by the user. The start state solution is the first candidate solution in the queue.

At 204, candidate(s) in the queue are evaluated according to the weighted objectives. Each of the candidate solutions in the queue are evaluated utilizing the weighted cost functions from procedures 201 and 202. A cost value is generated that reflects the cost from one or more of the weighted cost functions as specified by the user.

According to an embodiment of the present invention, a first plurality of cost functions account for a "backward cost" for a candidate solution and a second plurality of cost functions account for a "forward cost". The backward cost may reflect a cumulative cost to implement the candidate solution or a cumulative cost to implement the candidate solution from the start state. The forward cost may reflect a cumulative cost of remaining work to reach a goal. According to one aspect of this embodiment, the forward cost may reflect violations associated with the candidate solution.

At 205, a best candidate solution from the queue is identified and removed from the queue. According to an embodiment of the present invention, the candidate in the queue with the lowest cost value is designated as the best candidate solution. It should be appreciated that other criteria may be used for selecting the best candidate solution from the queue.

At 206, a goal test is applied to the best candidate solution. The goal test evaluates the best candidate to determine whether a goal for the interconnect architecture has been satisfied. According to an embodiment of the present invention, the goal test evaluates whether any violations exist in the best candidate solution. The goal test may require that the connections in the best candidate solution for the interconnect architecture have equal data widths on all connections. The goal test may also require that each master and slave node has a maximum fan-in and fan-out of one. It should be appreciated that other criteria may be used for the goal test.

At 207, it is determined whether the best candidate solution passes the goal test. If the best candidate solution does not pass the goal test, control proceeds to 208. If the best candidate solution passes the goal test, control proceeds to 209 where control terminates the procedure as a successful interconnect architecture has been generated.

At 208, additional candidate solutions ("successors" to the best candidate solution) are generated and added to the queue. The successors may be viewed as children of a parent solution. The additional candidate solutions are generated by adding one or more nodes, which represent components on the interconnect architecture, to the best candidate solution to reduce a number of violations. Control returns to 204 to evaluate the new candidate solutions in the queue.

It should be appreciated that the objectives and cost functions described may be applied globally to an entire design or to specified portions of the design. For example, a first section of the interconnect architecture may be designed and evaluated using a first plurality of cost functions while a second section of the interconnect architecture may be designed and evaluated using a second plurality of cost functions which differ from the first plurality of cost functions. In another example, the user may specify a same objective and cost function to be applied to two sections of the interconnect architecture. A first weighting factor may be selected for the cost function for a first section, and a second weighting factor may be selected for the same cost function for a second section, where the first and second weighting factors differ.

According to an embodiment of the present invention, a set of hard constraints may be provided by the user. The hard constraints may apply to the entire interconnect architecture or to specific connections within the interconnect architecture. In this embodiment, when a successor violates a hard constraint, that successor and all of its successors (children) are removed from the queue and from consideration after procedure 204. Examples of hard constraints include maximum latency on a connection, minimum throughput on a connection, maximum resource cost for an interconnect, and minimum operating frequency for the interconnect architecture. It should be appreciated that other hard constraints may be applied.

Figure 3:
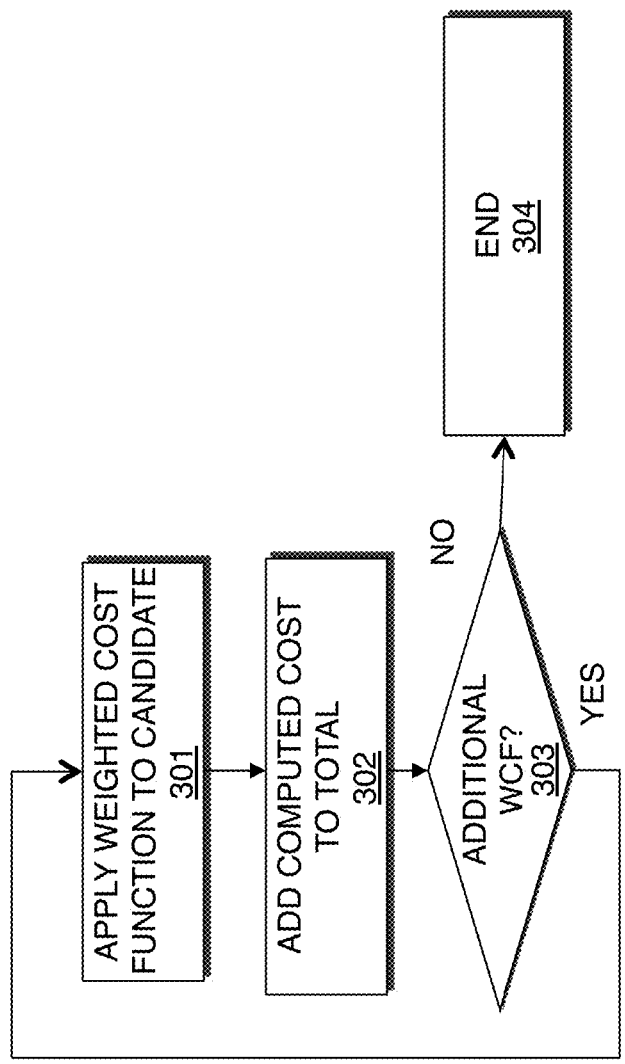
FIG. 3 is a flow chart illustrating a method for evaluating a candidate solution for an interconnect architecture according to an exemplary embodiment of the present invention.

FIG. 3 is a flow chart illustrating a method for evaluating a candidate interconnect architecture solution in a queue. The procedures described in FIG. 3 may be used to implement procedure 204 shown in FIG. 2. At 301, a weighted cost function is applied to a candidate to generate a cost. The weighted cost function may reflect one or more characteristics or aspects of an interconnect architecture. According to an embodiment of the present invention where a weighted cost function reflects resource cost, a sum of all hardware resources used by the candidate is computed by the weighted cost function. According to an embodiment of the present invention where the weighted cost function reflects latency cost, a sum of all path latencies in the candidate is computed by the weighted cost function utilizing a database of latency values associated for each component in the candidate. According to an embodiment of the present invention where the weighted cost function reflects throughput cost, a sum of throughput costs associate with paths from masters to slaves where a connection support a lower data width than that which a master supports is computed by the weighted cost function. According to an embodiment of the present invention where the weighted cost function reflects critical path, a longest-duration path in the candidate is computed by the weighted cost function utilizing timing path length values.

At 302, the cost computed at 301 is added to a total cost value.

At 303, it is determined whether an additional weighted cost function is to be applied to the candidate interconnect architecture solution. If it is determined that an additional weighted cost function is to be applied, control proceeds to 301. If it is determined that no additional weighted cost function is to be applied, control proceeds to 304 and terminates the procedure.

FIG. 3 illustrates an embodiment where a weighted cost function is applied to each candidate interconnect architecture solution at 301. It should be appreciated that instead of applying the weighted cost function directly to the candidate, an unweighted cost function may first be applied to the candidate to generate a cost, and a weighting factor be then be applied to the cost.

FIGS. 1-3 are flow charts that illustrate embodiments of the present invention. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 4:
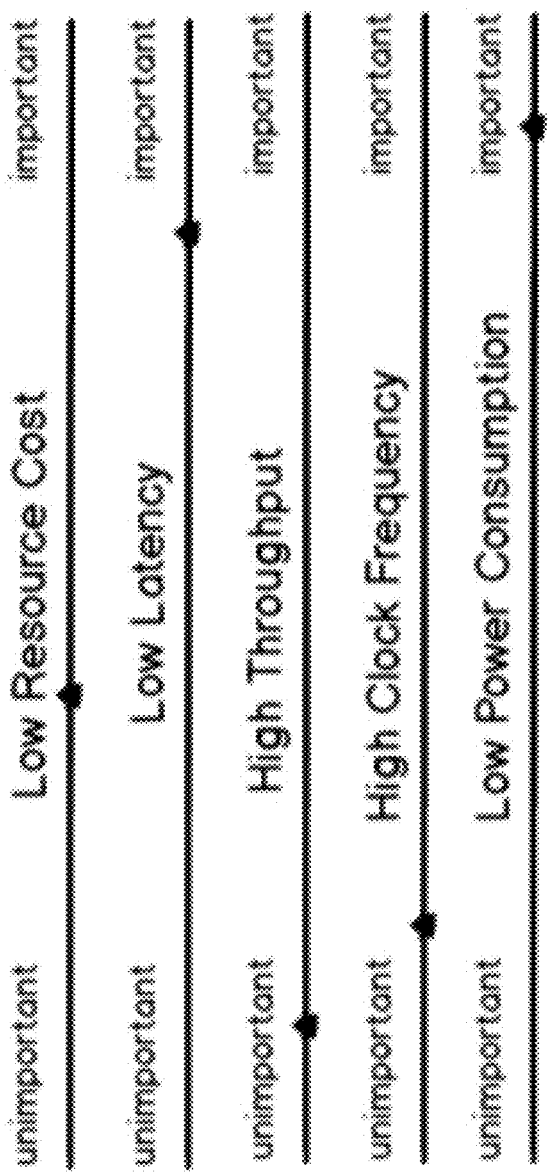
FIG. 4 is an exemplary user interface for inputting weights for cost functions according to an exemplary embodiment of the present invention.

FIG. 4 illustrates an exemplary user interface for inputting weights for cost functions according to an exemplary embodiment of the present invention. As shown, the user interface lists five objectives. These include low resource cost, low latency, high throughput, high clock frequency, and low power consumption. A slider bar is provided below each of the listed objectives to allow a user to select a weighting factor. The user may move a tab along a slider bar to a position that corresponds to a weighting factor. For example, if the tab along the slider bar for resource cost is moved to the left most position, a low weighting factor is assigned to a cost function evaluating resource cost. As a result, when generating an interconnect architecture solution, maintaining a low resource count would be low in priority.

It should be appreciated that other types of user interfaces may be provided to allow a user to select weighting factors for objectives. For example, a menu may be provided with selectable weighting factors, or an input area may be provided to allow a user to input values to quantify weighting factors for objectives. Alternatively, the user may be provided with a mechanism to select and input a file that includes vectors with weighting factors.

Figure 5:
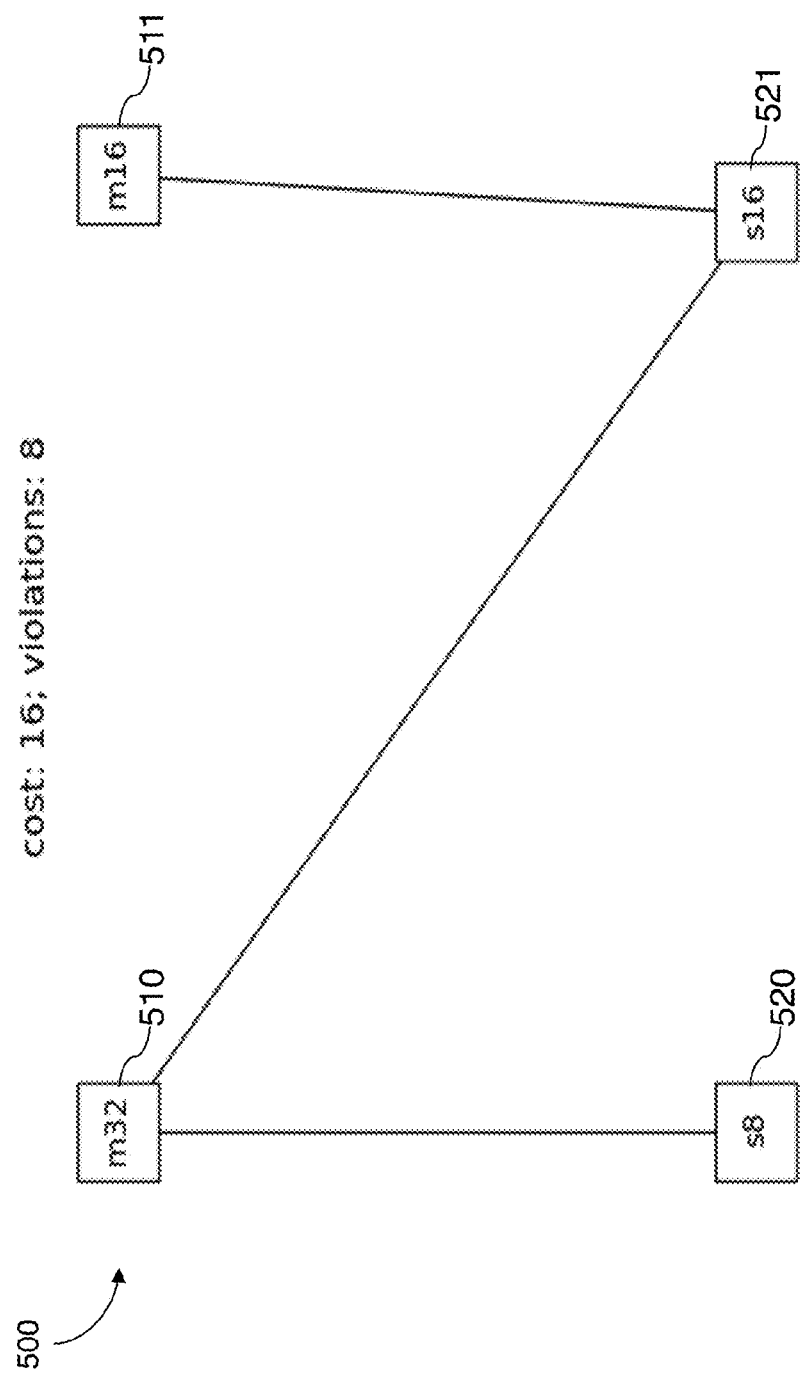
FIG. 5 illustrates a start state for an interconnect architecture solution according to an exemplary embodiment of the present invention.
Figure 6:
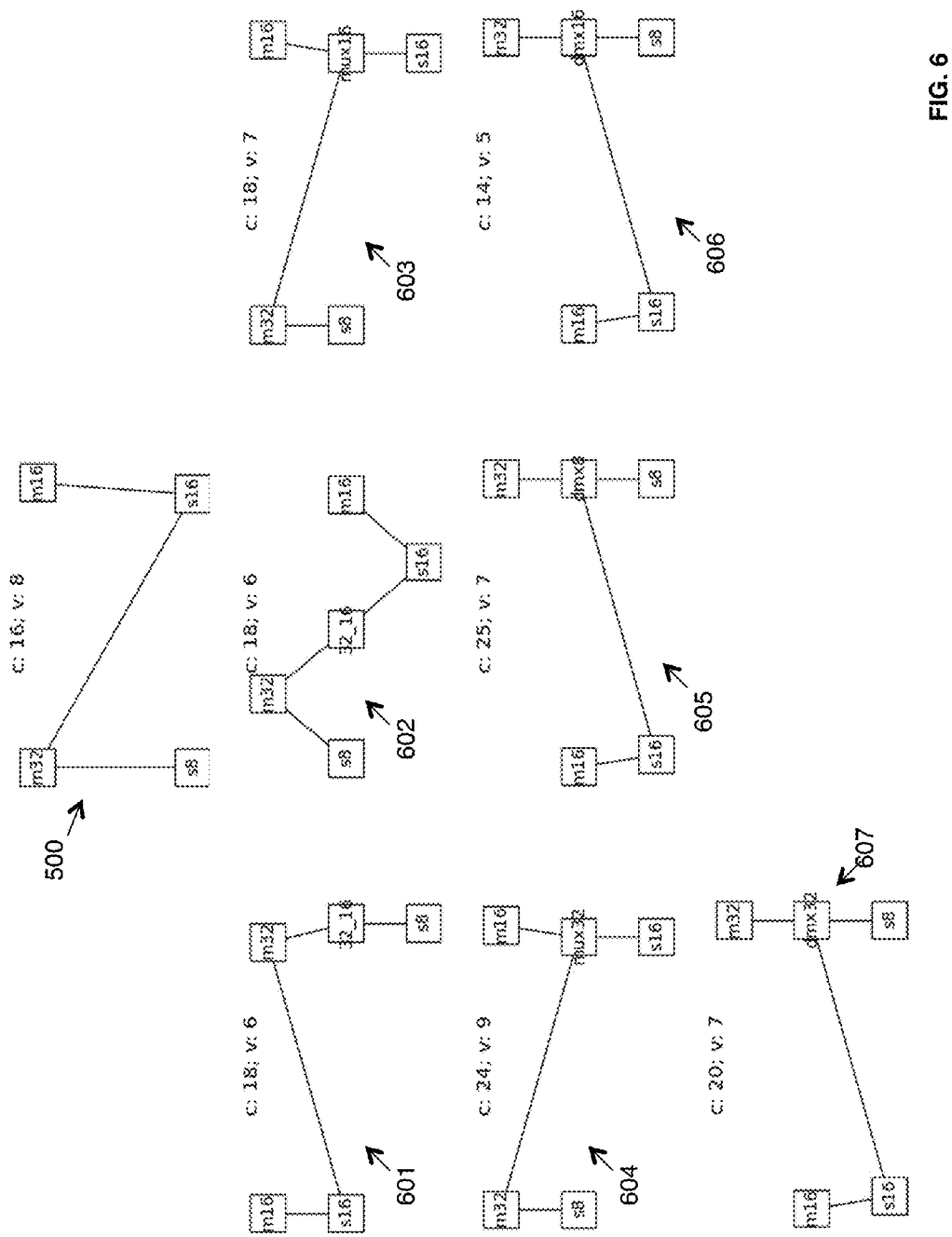
FIG. 6 illustrates successor interconnect architecture solutions according to an exemplary embodiment of the present invention.
Figure 7:
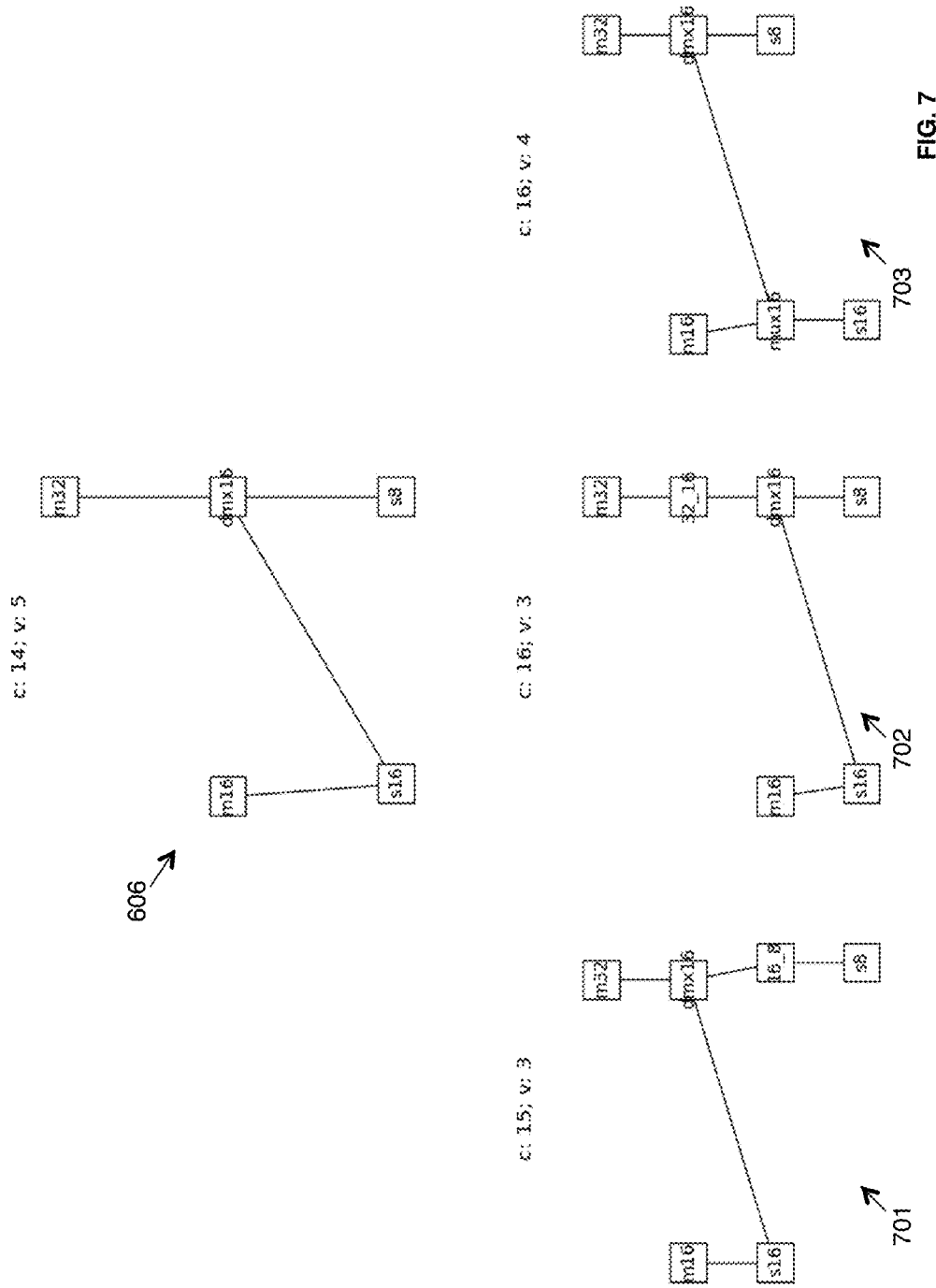
FIG. 7 illustrates successor interconnect architecture solutions for a selected candidate interconnect architecture solution according to an exemplary embodiment of the present invention.

FIGS. 5-7 illustrate an example of how an embodiment of the present invention generates solutions for an interconnect architecture. Referring to FIG. 2, after objectives are selected for the interconnect architecture by a user and the objectives are weighted by the user, a start state solution for the interconnect architecture is generated and added to a queue.

FIG. 5 illustrates a start state solution 500 for an interconnect architecture solution according to an exemplary embodiment of the present invention. As illustrated, the interconnect architecture solution 500 includes a 32-bit master interface 510, a 16-bit master interface 511, an 8-bit slave interface 520, and a 16-bit slave interface 521.

Referring back to FIG. 2, at 204, the start state solution 500 is evaluated. The start state solution may be evaluated by applying a plurality of weighted cost functions to evaluate various characteristics and aspects of the start state solution 500. According to an embodiment of the present invention, a first plurality of cost functions account for a "backward cost" for the start state solution which reflect a cumulative cost to implement the candidate solution. This value is computed to be 16. A second plurality of cost functions account for a "forward cost" for the start state solution which reflect violations associated with the start state solution. This value is computed to be 8. In this embodiment the cost value for the start solution 500 is determined to be the sum of the backward cost and forward cost, which is 24.

At 205, since the start state solution 500 is the only solution in the queue, it is removed from the queue.

At 206, a goal test is performed on the start state solution 500. As shown in FIG. 5, 8 violations are identified in the start state solution 500. As such, the start state solution 500 does not pass the goal test at 207.

At 208, additional candidate solutions are generated and added to the queue. The successors to the start state solution 500 may be viewed as children of the parent start state solution 500. The additional candidate solutions are generated by adding one or more nodes, which represent components on the interconnect architecture, to the start state solution 500 to reduce a number of violations.

FIG. 6 illustrates successor interconnect architecture solutions 601-607 generated from the start state solution 500 according to an exemplary embodiment of the present invention. Successor solution 601 adds a 32 to 16-bit width adapter between the 32-bit master interface and the 8-bit slave interface. Successor solution 602 adds a 32 to 16 bit width adapter between the 32-bit master interface and 16-bit slave interface. Successor solution 603 connects a 16-bit multiplexer to the 32-bit master interface, 16-bit master interface, and the 16-bit slave interface. Successor solution 604 connects a 32-bit multiplexer to the 32-bit master interface, 16-bit master interface, and the 16-bit slave interface. Successor solution 605 connects an 8-bit demultiplexer to the 32-bit master interface, 16-bit slave interface, and the 8-bit slave interface. Successor solution 606 connects a 16-bit demultiplexer to the 32-bit master interface, 16-bit slave interface, and the 8-bit slave interface. Successor solution 607 connects a 32-bit demultiplexer to the 32-bit master interface, 16-bit slave interface, and the 8-bit slave interface.

Referring back to FIG. 2, at 204, the successor solutions 601-607 are evaluated. The successor solutions 601-607 may be evaluated by applying a plurality of weighted cost functions to evaluate various characteristics and aspects of the solutions 601-607. Both the backward cost, c, and forward cost, v, of each successor solution is shown next to it on FIG. 6.

At 205, successor solution 606 is determined to be the best solution since it has the lowest cost of 19. Successor solution 606 is removed from the queue.

At 206, a goal test is performed on successor solution 606. As shown in FIG. 6, 5 violations are identified in successor solution 606. As such, successor solution 606 does not pass the goal test at 207.

At 208, additional candidate solutions are generated and added to the queue. The successors to successor solution 606 may be viewed as children of the parent successor solution 601.

FIG. 7 illustrates successor interconnect architecture solutions 701-703 generated from the successor solution 606 according to an exemplary embodiment of the present invention. Successor solution 701 adds a 16 to 8 bit width adapter between the 16-bit demultiplexer and the 8-bit slave interface. Successor solution 702 adds a 32 to 16 bit width adapter between the 32-bit master interface and the 16-bit demultiplexer. Successor solution 703 connects a 16-bit multiplexer between the 32-bit master interface, 8-bit slave interface, and 16-bit demultiplexer.

Referring back to FIG. 2, at 204, the successor solutions 701-703 are evaluated. The successor solutions 701-703 may be evaluated by applying a plurality of weighted cost functions to evaluate various characteristics and aspects of the solutions 701-703. Both the backward cost, c, and forward cost, v, of each successor solution is shown next to it on FIG. 7.

At 205, successor solution 701 is determined to be the best solution since it has the lowest cost of 18. Successor solution 701 is removed from the queue.

At 206, a goal test is performed on successor solution 701. As shown in FIG. 7, 3 violations are identified in successor solution 701. As such, successor solution 701 does not pass the goal test at 207.

The procedures illustrated in FIG. 2 are performed to continue to find a interconnect architecture solution that would satisfy the goal test of having no violations. As illustrated, the objectives selected and the weighting factors provided by the user guide the selection of a best candidate from which successors are generated until a valid solution is found.

According to an embodiment of the present invention, a user inputs an abstract system description that includes a set of interfaces with specific properties and a set of connections between interfaces with specific properties and requirements. As a result, a system design is generated which is realizable in hardware and has the lowest cost among other realizable systems. The measurement of cost is parameterized through the use of cost functions for evaluating solutions. A user may increase the importance of an objective measured by one cost function over another. The procedures implemented by embodiments of the invention generate solutions for an interconnect architecture, grades the solutions according to cost, and evaluates the solutions for validity. The best valid solution is returned. Which valid solution is best is based on the cost functions selected by the user and a set of weighting factors provided by the user. Embodiments of the present invention enables the user to create an interconnect architecture that satisfies specific needs, enables design space exploration through the input of weighting factors, and is extensible with the addition new objectives and cost functions.

Figure 8:
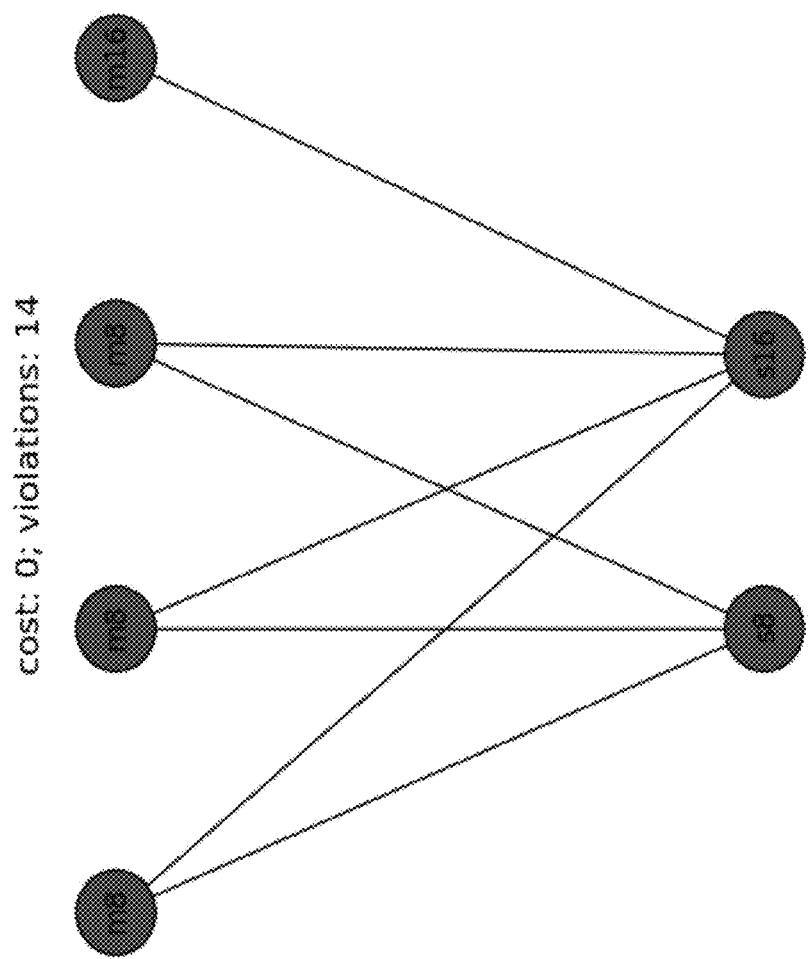
FIG. 8 illustrates a second example of a start state for an interconnect architecture according to an exemplary embodiment of the present invention.
Figure 9:
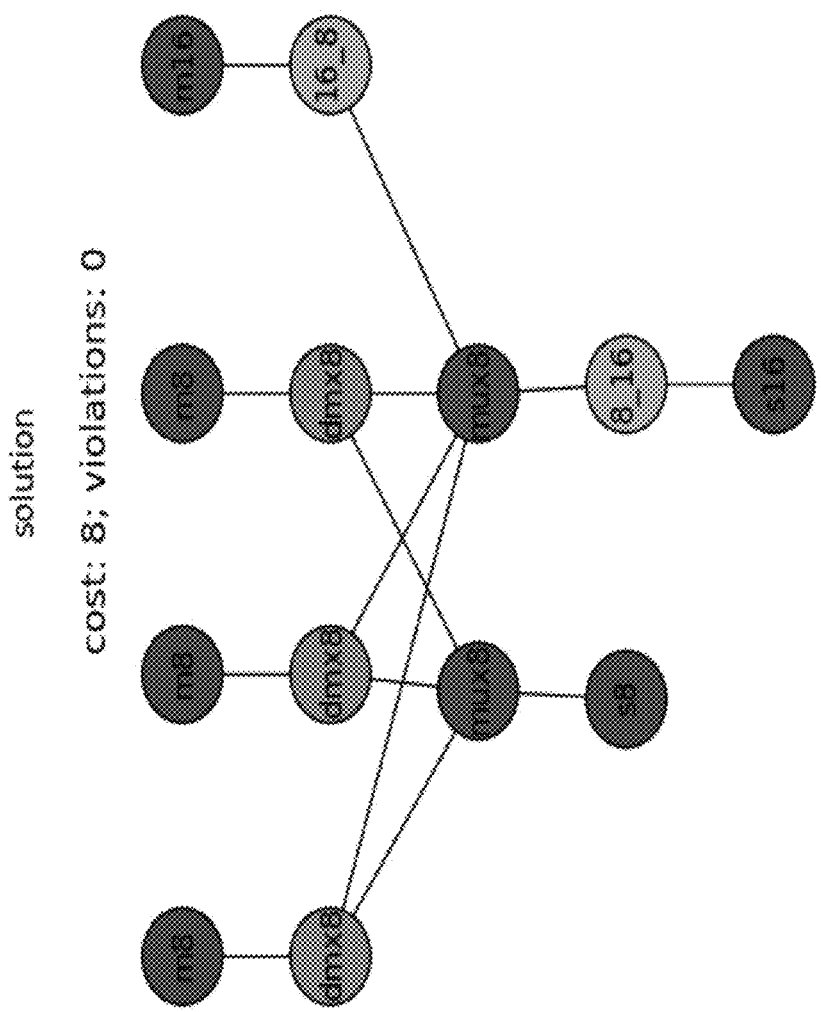
FIG. 9 illustrates a valid interconnect architecture solution generated in response to prioritizing low resource cost according to an exemplary embodiment of the present invention.
Figure 10:
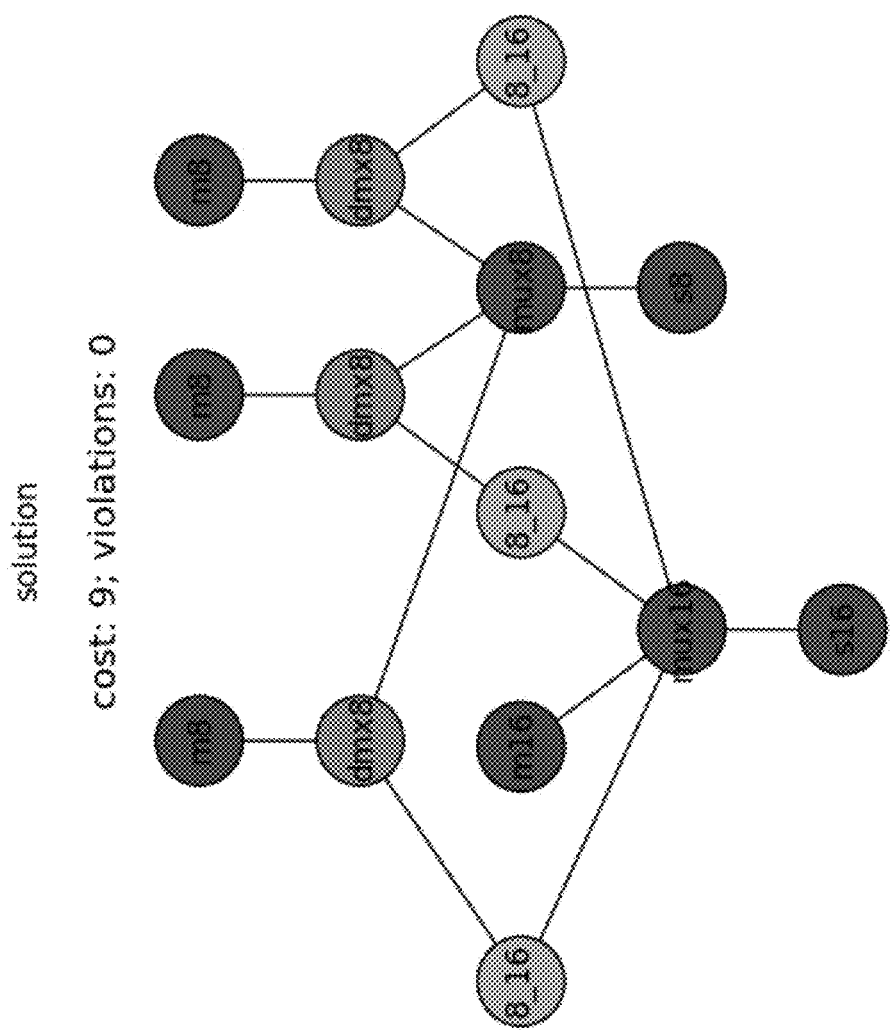
FIG. 10 illustrates a valid interconnect architecture solution generated in response to prioritizing high throughput according to an exemplary embodiment of the present invention.

FIGS. 8-10 illustrate an example where different weighting factors provided by a user may result in different solutions generated. FIG. 8 illustrates a start state solution generated from a system description that includes a set of interfaces provided by a user.

FIG. 9 illustrates a first solution that satisfies the goal test in response to cost functions which are parameterized to give high weight to resource cost. As illustrated, the path from the 16-bit master interface to the 16-bit slave interface traverses two width adapters, a 16 to 8 bit width adapter and a 8 to 16 bit width adapter. This solution would generate a throughput bottleneck in actual hardware, but results in a cost of 8.

FIG. 10 illustrates a second solution that satisfies the goal test in response to cost functions which are parameterized to give high weight to throughput. As illustrated, the path from the 16-bit master interface to the 16-bit slave interface is made directly without traversing any width adapters. However, in order to implement the direct path between the 16-bit master interface and the 16-bit interface, an additional width adapter is required, which results in a higher resource cost.

Figure 11:
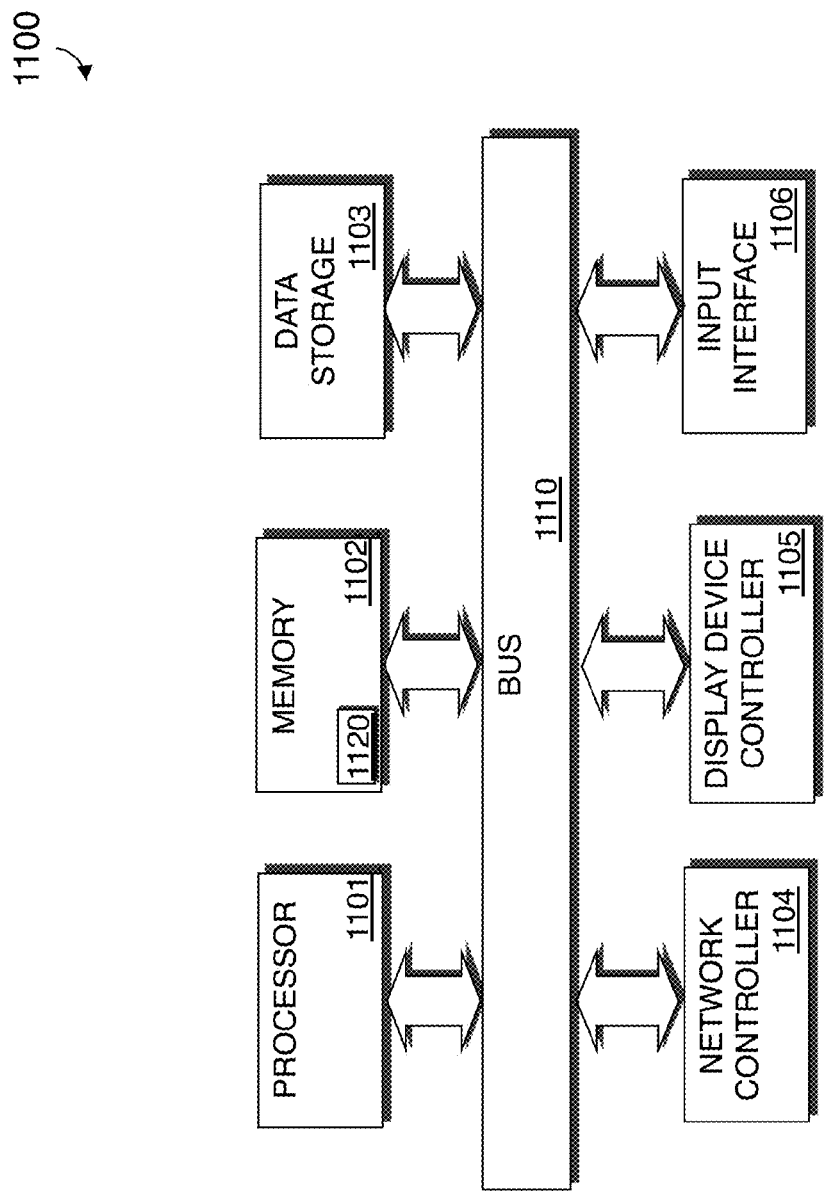
FIG. 11 illustrates a block diagram of a computer system implementing a system designer according to an embodiment of the present invention.

FIG. 11 is a block diagram of an exemplary computer system 1100 in which an example embodiment of the present invention resides. The computer system 1100 may be used to implement a system designer such as an EDA tool. The computer system 1100 includes a processor 1101 that processes data signals. The processor 1101 is coupled to a bus 1110 that transmits data signals between components in the computer system 1100. The bus 1110 may be a single bus or a combination of multiple buses. The computer system 1100 includes a memory 1102. The memory 1102 may be a dynamic random access memory device, a static random access memory device, and/or other memory device. The memory 1102 may store instructions and code represented by data signals that may be executed by the processor 1101. A data storage device 1103 is coupled to the bus 1110. The data storage device 1103 may be a hard disk drive, a floppy disk drive, a CD-ROM device, a flash memory device or other mass storage device.

A network controller 1104 is coupled to the bus 1110. The network controller 1104 may link the computer system 1100 to a network of computers (not shown) and supports communication among the machines. A display device controller 1105 is coupled to the bus 1110. The display device controller 1105 allows coupling of a display device (not shown) to the computer system 110 and acts as an interface between the display device and the computer system 1100. An input interface 1106 is coupled to the bus 1110. The input interface 1106 may be, for example, a keyboard and/or mouse controller or other input interface. The input interface 1106 allows coupling of an input device to the computer system 1100 and transmits data signals from an input device to the computer system 1100. It should be appreciated that computer systems having a different architecture or having different components may also be used to implement the computer system 1100.

According to an embodiment of the present invention, a system designer 1120 may reside in memory 1102 and be executed by the processor 1101. The system designer 1120 may operate to design an interconnect architecture for a system in response to objectives and weighting factors selected by a user. The objectives are represented and enforced by cost functions. Each cost function measures one or more aspects or characteristics of the interconnect architecture. Each of the cost functions is provided a weighting factor which reflects its importance to the user. The cost functions may reflect a system's throughput, length of critical path, maximum frequency, power consumption, use of hardware resources, and/or other characteristic or aspect. The system designer 1120 may also operate to synthesize, map, place and route the system onto a target device.

Figure 12:
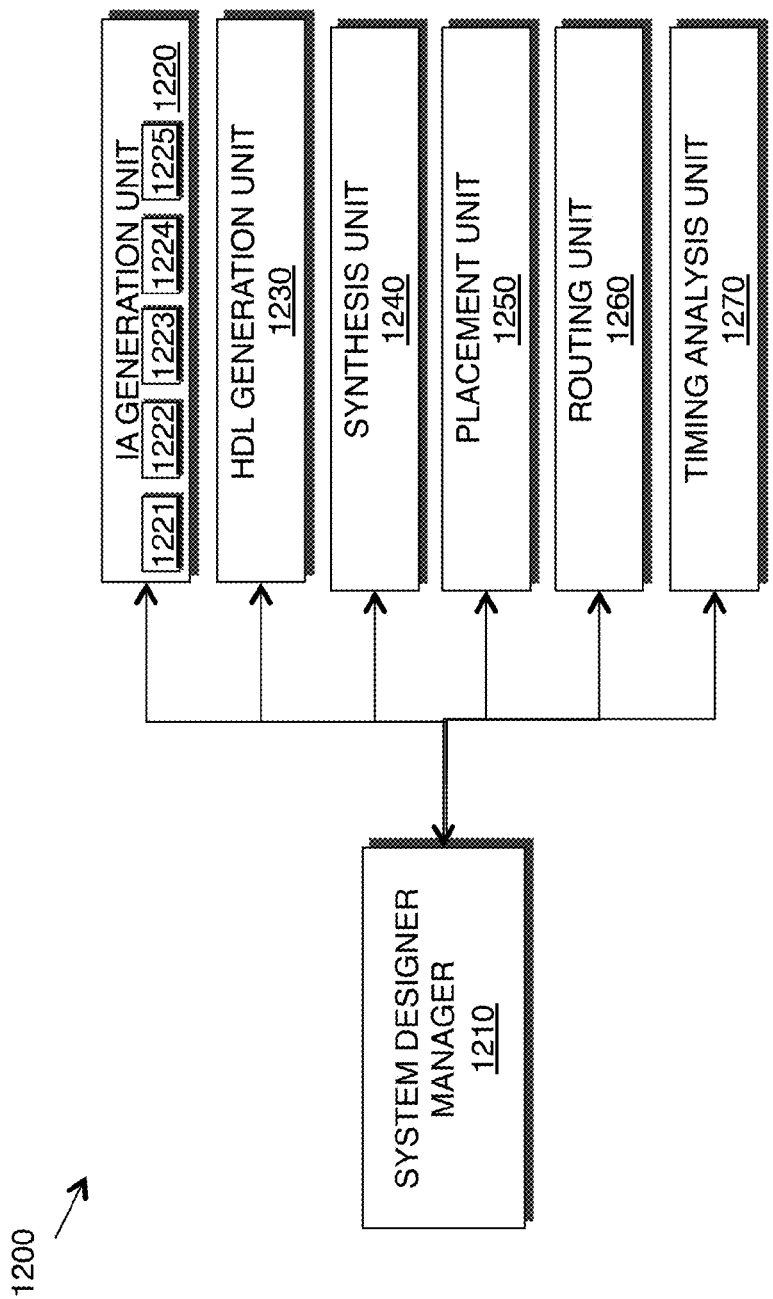
FIG. 12 illustrates a system designer according to an embodiment of the present invention.

FIG. 12 illustrates a system designer 1200 according to an embodiment of the present invention. The system designer 1200 may be used to implement the system designer 1120 described with reference to FIG. 10. The system designer 1200 may be an EDA tool for designing a system on a target device such as an FPGA, ASIC, structured ASIC, or other circuitry. FIG. 12 illustrates modules implementing an embodiment of the system designer 1200. According to one embodiment, the modules represent software modules and system design may be performed by a computer system such as the one illustrated in FIG. 11 executing sequences of instructions represented by the modules shown in FIG. 12. Execution of the sequences of instructions causes the computer system to support system design. In alternate embodiments, hard-wire circuitry may be used in place of or in combination with software instructions to implement embodiments of present invention. Thus, embodiments of present invention are not limited to any specific combination of hardware circuitry and software.

The system designer 1200 includes a designer manager 1210. The system designer manager 1210 is connected to and transmits data between the other components of the system designer 1200. The system designer manager 1210 provides an interface that allows a user to input data into the system designer 1200 and that allows the system designer 1200 to output data to the user.

The system designer 1200 includes an interconnect generation unit 1220. The interconnect generation unit 1220 generates an interconnect architecture for a system in response to a high-level system description, objectives, and weighting factors provided by the user. The interconnect generation unit 1220 includes an objective selection unit 1221. According to an embodiment of the present invention, the objective selection unit 1221 generates an interface to allow a user to select objectives for the interconnect architecture. Alternatively, the interface may allow the user to input objectives. The objectives include a corresponding cost function for evaluating one or more aspects or characteristics of an interconnect architecture solution.

The interconnection generation unit 1220 includes an objective weighting unit 1222. According to an embodiment of the present invention, the objective weighting unit 1222 generates an interface to allow the user to provide weighting factors to weight the objectives according to their relative importance to the user.

The interconnect generation unit 1220 includes a solution evaluation unit 1223. According to an embodiment of the present invention, the solution evaluation unit 1223 evaluates candidate solutions by utilizing the weighted cost functions. A cost value is generated that reflects the cost from one or more of the weighted cost functions as specified by the user.

The interconnect generation unit 1220 includes a goal test unit 1224. The goal test unit 1224 tests selected candidate solutions for the interconnect architecture to determine whether the solutions are valid. According to an embodiment of the present invention, the goal test unit 1224 requires that the candidate solution for the interconnect architecture have equal data widths on all connections. The goal test may also require that each master and slave node has a maximum fan-in and fan-out of one.

The interconnect generation unit 1220 includes a successor generation unit 1225. The successor generation unit 1225 generates additional candidate solutions ("successors") when a previously tested candidate fails the goal test. The additional candidate solutions are generated by adding one or more nodes, which represent components on the interconnect architecture, to the previously tested candidate solution to reduce a number of violations. The components within the interconnect generation unit 1220 work together to evaluate, test, and generate new candidate solutions until at least one candidate solution passes the goal test and is determined to be valid.

The system designer includes a hardware description language (HDL) generation unit 1230. The HDL generation unit 1230 generates an HDL design definition of the system from the high-level description of the system provided by the user and the interconnect architecture generated by the interconnect generation unit 1220.

The system designer 1200 includes a synthesis unit 1240. The synthesis unit 1240 generates a logic design of the system to be implemented by the target device. According to an embodiment of the present invention, the synthesis unit 1240 generates an optimized logical representation of the system from the HDL design definition and maps the optimized logic design. According to an embodiment of the present invention, a synthesis netlist is generated from mapping. This synthesis netlist may be an optimized technology-mapped netlist generated from the HDL.

The system designer 1200 includes a placement unit 1250. According to an embodiment of the present invention, the placement unit 1250 places the mapped logical system design on the target device. Placement works on the technology-mapped netlist to produce a placement for each of the functional blocks. According to an embodiment of the present invention, placement unit 1250 fits the system on the target device by determining which resources on the logic design are to be used for specific logic elements, and other function blocks determined to implement the system as determined during synthesis. Placement may include clustering which involves grouping logic elements together to form the logic clusters present on the target device. A placement netlist is generated from placement.

The system designer 1200 includes a routing unit 1260 which routes the placed design on the target device. The routing unit 1260 allocates routing resources on the target device to provide interconnections between logic gates, logic elements, and other components on the target device. The routing unit 1260 may also perform routability optimization on the placed logic design. A routing netlist is generated from routing.

The system designer 1200 includes a timing analysis unit 1270 which performs timing analysis on the design of the system generated. According to an embodiment of the present invention, the timing analysis determines whether timing constraints of the system are satisfied. The timing analysis may utilize approximations depending on when it is performed.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 13:
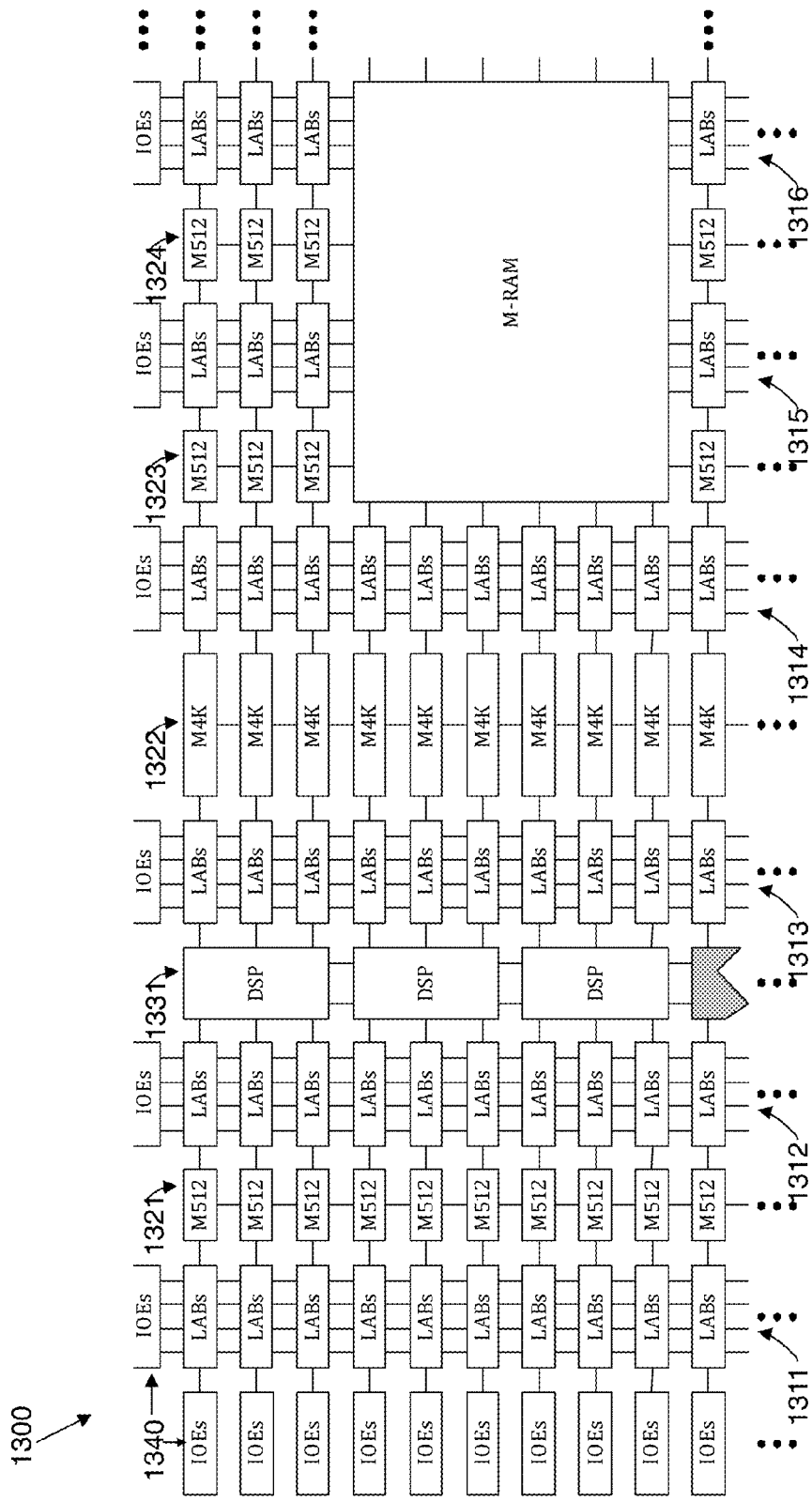
FIG. 13 illustrates an exemplary target device according to an embodiment of the present invention.

FIG. 13 illustrates a device 1300 that may be used to implement a target device according to an embodiment of the present invention. The device 1300 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1300. Columns of LABs are shown as 1311-1316. It should be appreciated that the logic block may include additional or alternate components.

The device 1300 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1300. Columns of memory blocks are shown as 1321-1324.

The device 1300 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1300 and are shown as 1331.

The device 1300 includes a plurality of input/output elements (IOEs) 1340. Each IOE feeds an IO pin (not shown) on the device 1300. The IOEs 1340 are located at the end of LAB rows and columns around the periphery of the device 1300. Each IOE may include a bidirectional IO buffer and a plurality of registers for registering input, output, and output-enable signals.

The device 1300 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for generating a design for a system implemented on a target device, the method comprising:
    presenting a user with an interface that allows the user to weight objectives for an interconnect architecture of the design by indicating an importance of an objective relative to other objectives; and
    generating the interconnect architecture in response to the weighted objectives, wherein at least one of the presenting and generating is performed by a processor, wherein the weighted objectives includes a first set of weighted objectives that applies to a first section of the system and a second set of weighted objectives, different from the first set of weighted objectives, that applies to a second section of the system.

2. The method of claim 1, wherein one of the objectives comprises supporting a high throughput.

3. The method of claim 1, wherein one of the objectives comprises supporting low latency.

4. The method of claim 1, wherein one of the objectives comprises supporting a low resource count.

5. The method of claim 1, wherein one of the objectives comprises supporting low power consumption.

6. The method of claim 1, wherein the interface comprises:
    a listing of objectives which include throughput, latency, resource cost, and power consumption; and
    a slider corresponding to each of the objectives which allows the user to select a weight for each of the objectives.

7. The method of claim 1, wherein generating the interconnect architecture comprises considering a cost for implementing candidate interconnect architecture solutions where the cost is derived from the weighted objectives.

8. The method of claim 7 further comprising considering a cost for violations incurred by candidate interconnect architecture solutions where the cost for the violations incurred is derived from the weighted objectives.

9. The method of claim 8, wherein generating the interconnect architecture further comprises selecting a candidate interconnect architecture with a lowest combined cost.

10. The method of claim 1, wherein generating the interconnect architecture in response to the weighted objectives comprises adding one of master/slave interfaces, multiplexer/demultiplexers, and width adapters.

11. The method of claim 1, wherein generating the interconnect architecture in response to the weighted objectives comprises:
    generating a start state solution for the interconnect architecture; and
    performing a goal test on the start state solution.

12. A non-transitory computer readable medium including a sequence of instructions stored thereon for causing a computer to execute a method comprising:
    generating an interconnect architecture for a system in response to system components and requirements, and weighted objectives provided by a user that include a first set of weighted objectives that applies to a first section of the system, and a second set of weighted objectives, different from the first set of weighted objectives, that applies to a second section of the system.

13. The non-transitory computer readable medium of claim 12, wherein generating the interconnect architecture comprises:
    generating a start state solution for the interconnect architecture; and
    performing a goal test on the start state solution.

14. The non-transitory computer readable medium of claim 13, wherein the goal test requires that all connections have equal data widths.

15. The non-transitory computer readable medium of claim 13, wherein the goal test requires that each slave and master node has a maximum fan-in and fan-out of 1.

16. The non-transitory computer readable medium of claim 13, wherein the method further comprises generating candidate solutions for the interconnect architecture in response to the start state solution failing the goal test.

17. The non-transitory computer readable medium of claim 16, wherein generating candidate solutions comprises adding a node to the start state solution, wherein the node decreases a number of violations incurred.

18. The non-transitory computer readable medium of claim 16, wherein the method further comprises:
    selecting a candidate interconnect architecture solution with a lowest cost; and
    performing the goal test for the selected candidate interconnect architecture solution.

19. The non-transitory computer readable medium of claim 18, wherein the method further comprises generating candidate solutions for the interconnect architecture in response to the selected candidate interconnect architecture failing the goal test.

20. The non-transitory computer readable medium of claim 12, wherein generating the interconnect architecture in response to the weighted objectives comprises adding one of master/slave interfaces, multiplexer/demultiplexers, and width adapters.

21. The non-transitory computer readable medium of claim 12, wherein the weighted objectives indicate an importance of an objective relative to other objectives.

22. A graphical user interface, comprising:
    a mechanism that allows a user to select objectives for a design of an interconnect architecture for a system to be implemented on a target device; and
    a mechanism that allows the user to weight the objectives and input the weighted objectives into a interconnect design tool that generates the design of the interconnect architecture in response to the weighted objectives, wherein the weighted objectives include a first set of weighted objectives that applies to a first section of the system, and a second set of weighted objectives, different from the first set of weighted objectives, that applies to a second section of the system, and wherein at least one of the mechanism that allows a user to select objectives and the mechanism that allows the user to weight the objectives is implemented by a processor.

23. The graphical user interface of claim 22, wherein the selectable objectives comprises throughput, latency, resource count, and power consumption.

24. The graphical user interface of claim 22, wherein the mechanism that allows the user to select objectives comprises a selectable menu.

25. The graphical user interface of claim 22, wherein the mechanism that allows the user to weight the objective comprises a slider.

26. The graphical user interface of claim 22, wherein the mechanism that allows the user to weight the objective comprises an input line.

27. The graphical user interface of claim 22, wherein the target device is a field programmable gate array.

28. The graphical user interface of claim 22, wherein the target device is a structured application specific integrated circuit.

29. The graphical user interface of claim 22, wherein the interconnect design tool that generates the design of the interconnect architecture in response to the weighted objective adds one of master/slave interfaces, multiplexer/demultiplexers, and width adapters.

30. The graphical user interface of claim 22, wherein the interconnect design tool that generates the design of the interconnect architecture in response to the weighted objective generates a start state solution for the interconnect architecture, and performs a goal test on the start state solution.

31. The graphical user interface of claim 22, wherein the weighted objectives indicate an importance of an objective relative to other objectives.

* * * * *